(No Model.)
W. M. LITTLE.
TAG MACHINE.
No. 519,264. Patented May 1, 1894.
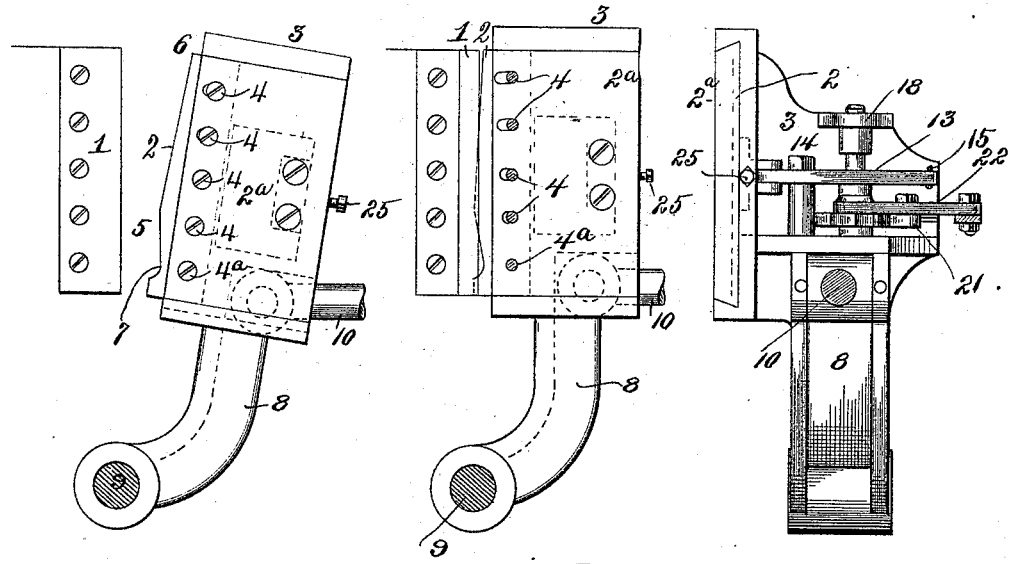
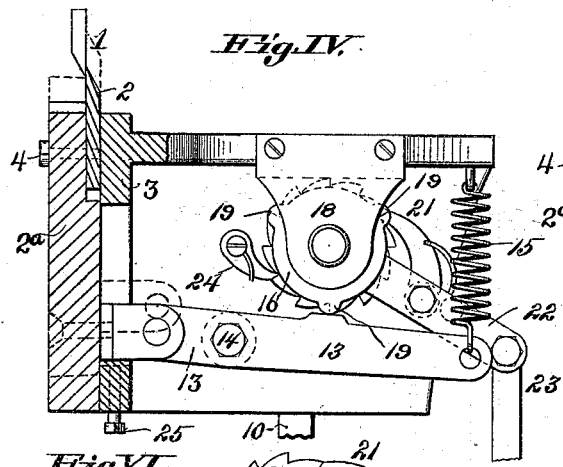
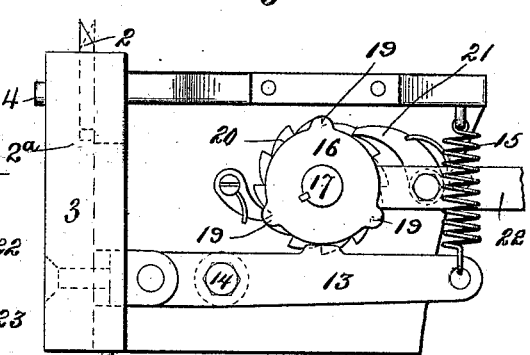
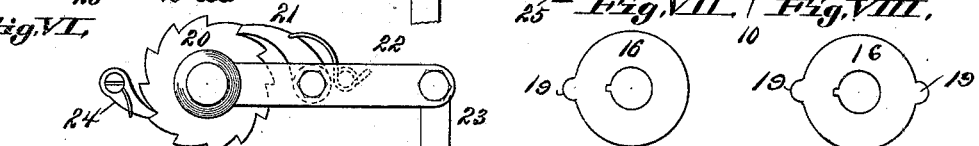
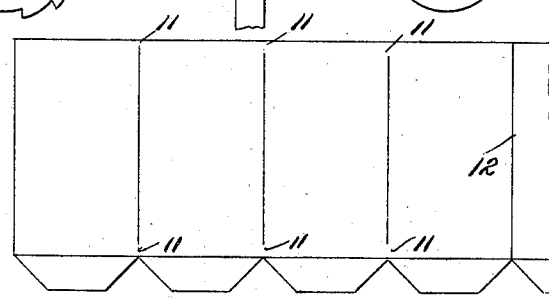
Attest:
A. M. Ebersole
J. C. Ebersole
Inventor,
Wm. M. Little
By Knight Bro.
Attys

UNITED STATES PATENT OFFICE.

WILLIAM M. LITTLE, OF VANDALIA, ILLINOIS.

TAG-MACHINE.

SPECIFICATION forming part of Letters Patent No. 519,264, dated May 1, 1894.

Application filed August 12, 1893. Serial No. 483,012. (No model.)

*To all whom it may concern:*

Be it known that I, WILLIAM M. LITTLE, of Vandalia, Fayette county, Illinois, have made a certain new and useful Improvement in Tag-Machines, of which the following is a full, clear, and exact description, reference being had to the accompanying drawings, forming a part of this specification.

My present invention relates to the tag cutting portion of the machine, the object being to provide for cutting two or more tags with connecting fins or webs, and then, by an automatic change in the machine, cut this gang of tags off by cutting all the way across the tag strip.

My invention consists in features of novelty hereinafter fully described and pointed out in the claims.

Figure I is an elevation of the fixed and movable knives showing them open. Fig. II is a similar view, showing the knives closed the heads of the screws which secure the movable knife being omitted. Fig. III is an elevation looking at the rear end of the movable knife, its head, and the moving parts. Fig. IV is a top or plan view, the head being in section and showing the knives closed and the parts in the position they occupy when the knives cut entirely across the strip. Fig. V is a top view showing the knives open, and the parts in the position they occupy when the knives cut only partially across the strip, leaving the connecting fins. Fig. VI is a top view, showing the ratchet and its pawls. Figs. VII and VIII are views of the disk for adjusting the parts to cut entirely across the strip, Fig. VII showing the disk with one projection, and Fig. VIII showing it with two projections. Fig. IX is a diagram showing the manner of cutting the tags.

Referring to the drawings, 1 represents the fixed knife of the machine, and 2 the movable knife, secured to a plate $2^a$ dove-tailed into a head 3, as shown in Fig. III. This knife is held adjustably to the plate by pins or screws 4, the lower pin or screw $4^a$ fitting in a perforation in the knife and plate, and the upper screws or pins fitting in slots in the plate, as shown in Fig. II, so that the upper part of the knife can be adjusted when desired, relatively to the plate, the knife moving on the lower pin $4^a$ as a pivot. The edge of the knife 2 diverges or slants inwardly to a point 7. Head 3 is carried by an arm 8, hinged or pivoted at 9 to a fixed point.

10 is a rod by which the head 3 is moved to carry the knife 2 to and from the knife 1. The knife 2 is moved to the position shown in Fig. II and cuts across the tag strip with the exception of a short fin or web 11 at each end of the tag, as shown in Fig. IX. When one or more of these slits have been made in the tag slip thus forming a gang of tags nearly separated, this gang is cut off by severing the web of paper all the way across, as shown at 12, Fig. IX. This is done by causing the knife 2 to move a little farther with relation to the knife 1, and this is effected automatically through means of a lever 13, pivoted or hinged at 14 to the head 3, and the free end of which is connected by a spring 15 to the head; see Figs. III, IV and V. The tendency of the spring 15 is to hold the knife 2 in its inner position, so it will not cut entirely across the tag slip. When the outer end of the lever 13 is forced into the position shown in Fig. IV against the pressure of the spring 15, the knife plate $2^a$ is moved forwardly in the head 3, so that when the head advances the knife will cut entirely across the tag strip, and this is done automatically by means of a disk 16, secured to a shaft 17, journaled in the head 3 by means of suitable brackets 18. On the periphery of the disk 16 is one or more projections 19. I have shown one projection in Fig. VII, two in Fig. VIII, and three in Fig. V. When one of these projections comes against the lever 13, and forces the lever into position shown in Fig. IV, the knife 2 is moved forward. Then when the projection leaves the lever 13 the knife is drawn back by means of the spring 15. The disk 16 is turned automatically through means of a ratchet wheel 20 secured to the shaft 17, and engaged by a pawl 21 on an arm 22, connected to a bar 23. As the head 3 moves forwardly the pawl 21 slips over one of the teeth of the ratchet wheel, and as the head recedes the pawl and ratchet wheel turn the shaft 17, and, consequently, the disk 16, the distance of one of the teeth of the ratchet wheel. The next time the head moves forward and back the disk is turned the distance of another tooth, and thus the projections 19 are brought at regular intervals against the lever 13 and the knife is made to cut entirely across the tag slip.

24 represents a pawl for preventing retrograde movement of the shaft 17.

25 is a set screw for limiting the backward movement of the knife.

By the use of my invention a gang of tags may be cut almost entirely across the web of paper, yet leaving a sufficient fin or web at each end to hold the separate tags together, and thus a number of tags can be handled together with the same facility that one tag could be handled, while these tags can be easily and conveniently separated when it is desired to do so. The bevels of the knives 1 and 2 may be reversed, as shown by dotted lines, Fig. V.

I claim as my invention—

1. In a tag machine, the combination of a fixed knife, a movable head having an adjustable knife, and means for adjusting the adjustable knife, consisting essentially of a pivoted lever, a spring for drawing the lever in one direction to retract the adjustable knife, and an operated disk, having projections for engaging said lever to move it in opposition to the spring to project the adjustable knife; substantially as described and for the purposes set forth.

2. In a tag machine, the combination of a fixed knife, a movable head, a knife adjustably held in said head and means for moving said adjustable knife with relation to the head, consisting essentially of a pivoted lever, a spring for drawing the lever in one direction to retract the adjustable knife and a disk having projections on its periphery for moving the lever in opposition to the spring to project the adjustable knife; said disk being moved through means of a ratchet-wheel and pawl; substantially as and for the purposes set forth.

3. In a tag machine, the combination of a fixed knife, a movable head, a knife adjustably held in said head, and mechanism for adjusting the adjustable knife with relation to the head, consisting of a spring lever, and means for shifting the lever; said adjustable knife having an inwardly diverging cutting edge; substantially as and for the purposes set forth.

4. In a tag machine, the combination of a fixed knife, a movable head having the slotted and perforated plate 2$^a$, the knife 2 held to said plate by screws fitting in said slots and perforation, and mechanism for moving said plate with relation to said head, substantially as set forth.

WILLIAM M. LITTLE.

In presence of—
W. M. FARMER,
JOHN J. BROWN.